United States Patent [19]
Griesenbrock

[11] 3,980,347
[45] Sept. 14, 1976

[54] FAIL-SAFE BRAKING SYSTEM

[75] Inventor: Karl-Heinz Griesenbrock, Heiligenhaus, Germany

[73] Assignee: Eaton Corporation, Cleveland, Ohio

[22] Filed: June 17, 1975

[21] Appl. No.: 587,755

[30] Foreign Application Priority Data
June 22, 1974 Germany............................ 2430049

[52] U.S. Cl.............................. 303/6 R; 188/71.4; 188/72.4; 188/151 A; 200/82 D; 303/84 A
[51] Int. Cl.²....................................... B60T 17/22
[58] Field of Search............... 303/6 R, 6 C, 84 R, 303/84 A, 21 AF; 188/151 A, 345, 106 P, 71.3, 71.4, 71.1, 72.5, 72.4, 18 A; 200/82 D, 82 C, 82 R, 81 H, 81 R; 340/52 C, 52 R; 192/4 A; 74/411.5

[56] References Cited
UNITED STATES PATENTS

| | | | |
|---|---|---|---|
| 2,710,620 | 6/1955 | Watson | 303/84 A |
| 2,902,557 | 9/1959 | Brockman | 200/82 C |
| 3,280,401 | 10/1966 | Cook et al. | 303/6 R X |
| 3,465,853 | 9/1969 | Zabalbeitia | 188/18 A |
| 3,473,851 | 10/1969 | Neves | 303/84 A |
| 3,477,549 | 11/1969 | Barton | 188/345 |
| 3,485,329 | 12/1969 | Hauser | 192/4 A |
| 3,602,554 | 8/1971 | Ichimura et al. | 303/21 AF |
| 3,748,413 | 7/1973 | Sawyer | 200/82 R X |
| 3,840,098 | 10/1974 | Alt et al. | 303/6 R X |
| 3,882,972 | 5/1975 | Newstead et al. | 188/72.5 |

FOREIGN PATENTS OR APPLICATIONS

1,815,901  6/1970  Germany ........................ 303/84 A

Primary Examiner—George E. A. Halvosa
Assistant Examiner—Douglas C. Butler
Attorney, Agent, or Firm—Teagno & Toddy

[57] ABSTRACT

A dual braking system for industrial vehicles of the type in which only two wheels on a common axis are normally braked, and which includes a hydraulic disc brake system in which each wheel has two separate sets of brake cylinders which are connected by separate lines to a common master cylinder. In case of failure of one of the supply lines, a valve interposed between the master cylinder and the brake cylinders closes off the failed line in response to the pressure imbalance caused by the failure. The movable element of the valve is also adapted to close a switch which can be connected in a suitable indicator circuit to warn the vehicle operator that a failure has occurred. According to another aspect of the invention, a floating brake disc is disclosed.

4 Claims, 3 Drawing Figures

FAIL-SAFE BRAKING SYSTEM

The invention relates to vehicle brake systems, and more particularly to a hydraulic service brake system for vehicles with two wheel braking systems.

Industrial vehicles, such as fork lift trucks, are generally four-wheel vehicles in which only two of the wheels are braked. Usually, joint operated disc or drum brakes are separately arranged on a drive unit each either at the wheel or inboard, adjacent the transmission output. In prior art vehicles, if a leakage due to a defect occurs in a hydraulic system, braking is effected through an auxiliary mechanically operated control mechanism operating on the same brakes, or through a mechanically operated braking system which is independent of the service brakes.

The change from hydraulic to mechanical brake operation upon realization of the brake failure necessarily involves a free wheel period during which, e.g. where lift trucks are concerned, persons or goods may suffer damage. There has so far been no possibility of increasing safety through the adoption of a dual-circuit braking system actuated by a tandem master cylinder of known design in vehicles having only two wheels capable of being braked arranged on an axis, since, in case of a defective brake supply line or the like, it would not be possible to brake both wheels or diagonally associated wheels, but only one of the braked wheels, which would not be acceptable from the standpoint of directional stability.

It is the object of the present invention to provide a brake assembly through which a dual-circuit braking system may easily and efficiently be employed in such vehicles.

According to the invention, this is, achieved by providing each wheel capable of being braked with a brake disc or rotor with two double-pistons arranged between the two discs, both pistons of each double-piston being forced into engagement with its rotor by pressurized hydraulic fluid fed to a pressure chamber located between them. A common pressure source serves both sets of pistons via separate supply lines leading to individual pressure chambers for each set of double pistons.

Besides simplicity, this configuration offers a high degree of braking safety, since in case of a sudden brake in a pressure line, immediate braking at half braking power is still available, and the braking power of the vehicle may then quickly be increased by increasing the pedal operating force.

It has also been found to be advantageous if the brake discs are floatingly arranged axially on the transmission output shafts and pressed against fixed brake pads on the wheels by means of brake pads on the brake pistons, thus allowing high brake power within a minimum space.

In addition, each double-piston may consist of a group of parallely controlled double-piston units, which provides the necessary brake force at moderate surface pressure.

The supply of hydraulic fluid to the two pressure chambers of the two double-pistons may take place in a known manner by means of a tandem master cylinder. This would ordinarily involve the loss of fluid with every stroke of the master cylinder in case of repeated brake operation after a line failure, such loss limiting the number of braking actions where single-chamber brake-fluid reservoirs are used. Although the use of a twin-chamber brake-fluid reservoir ensures the supply of pressure medium from one chamber to the brake circuit which is still intact, the disadvantage of losing pressure medium is aggravated by the danger of skidding of the vehicle on the lost fluid.

Further according to the invention, pressure is admitted to the two pressure chambers of the two double-pistons through a single-acting master cylinder through a valve connected at the outlet end of said cylinder, such valve admitting pressure under normal conditions to both pressure chambers and, in case of a serious leakage in the supply line, to one of the pressure chambers, cutting off the supply of fluid to the respective line. In this manner, the admission of pressure to the intact brake circuit may take place any number of times without further loss of fluid while the vehicle is taken to a repair facility.

In accordance with a preferred embodiment of the invention, the valve is provided with a spool normally retained in center position which, while in such center position, permits the supply of fluid from the master cylinder to both supply lines and which, in case of pressure drop on its one side due to a major leakage in one of the two supply lines, shuts off the supply of fluid to the respective line in response to the pressure imbalance.

The spool of the valve may further be provided with at least one setting pin projecting from the valve body, such pin acting not only as a mechanical resetter when a line defect is being remedied but also as a switch actuator to provide a visible or audible warning signal, an automatic decelerator, or the like, released after the defect has occurred, with the position of the setting pin indicating the defective supply line.

Referring to the drawings.

Figure 1:
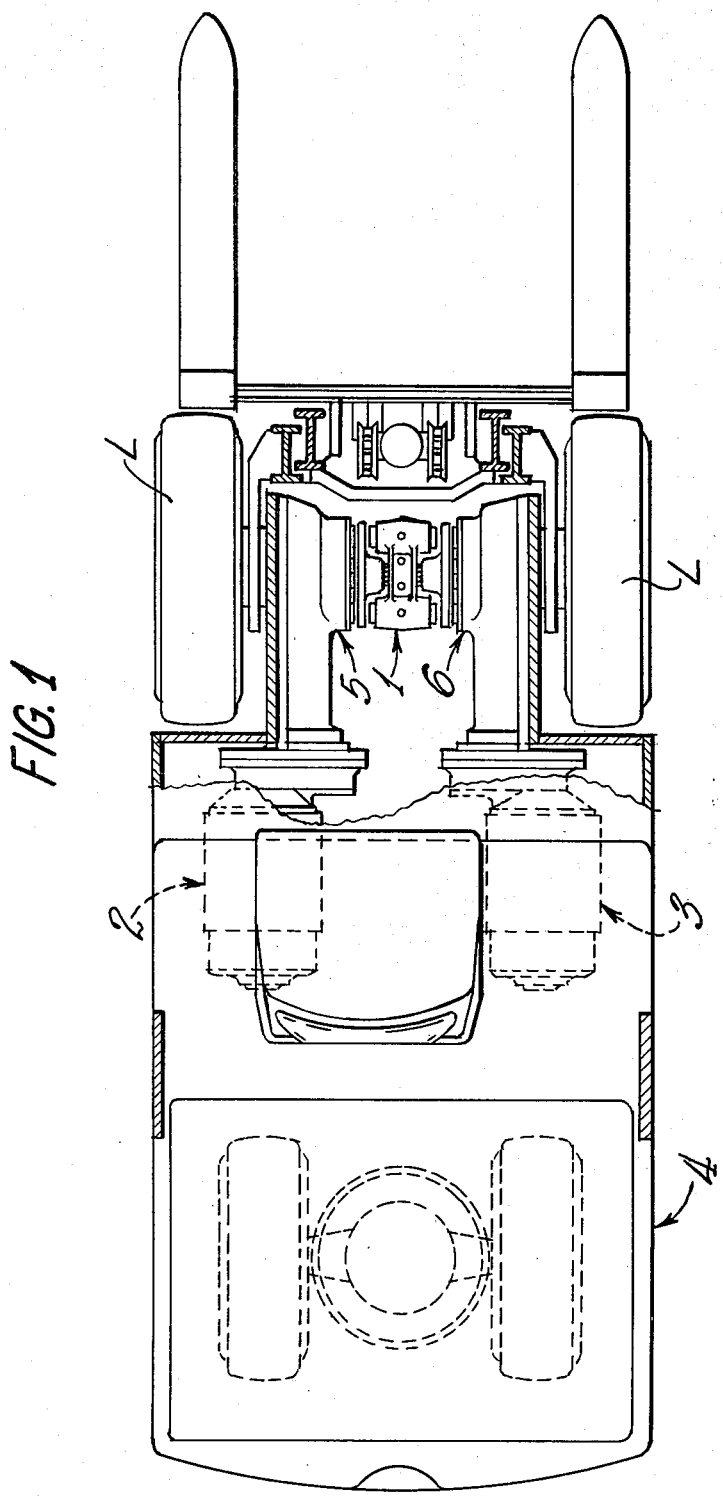
FIG. 1 is a plan view, shown partly in section, of an industrial vehicle incorporating a brake system in accordance with the invention.
Figure 2:
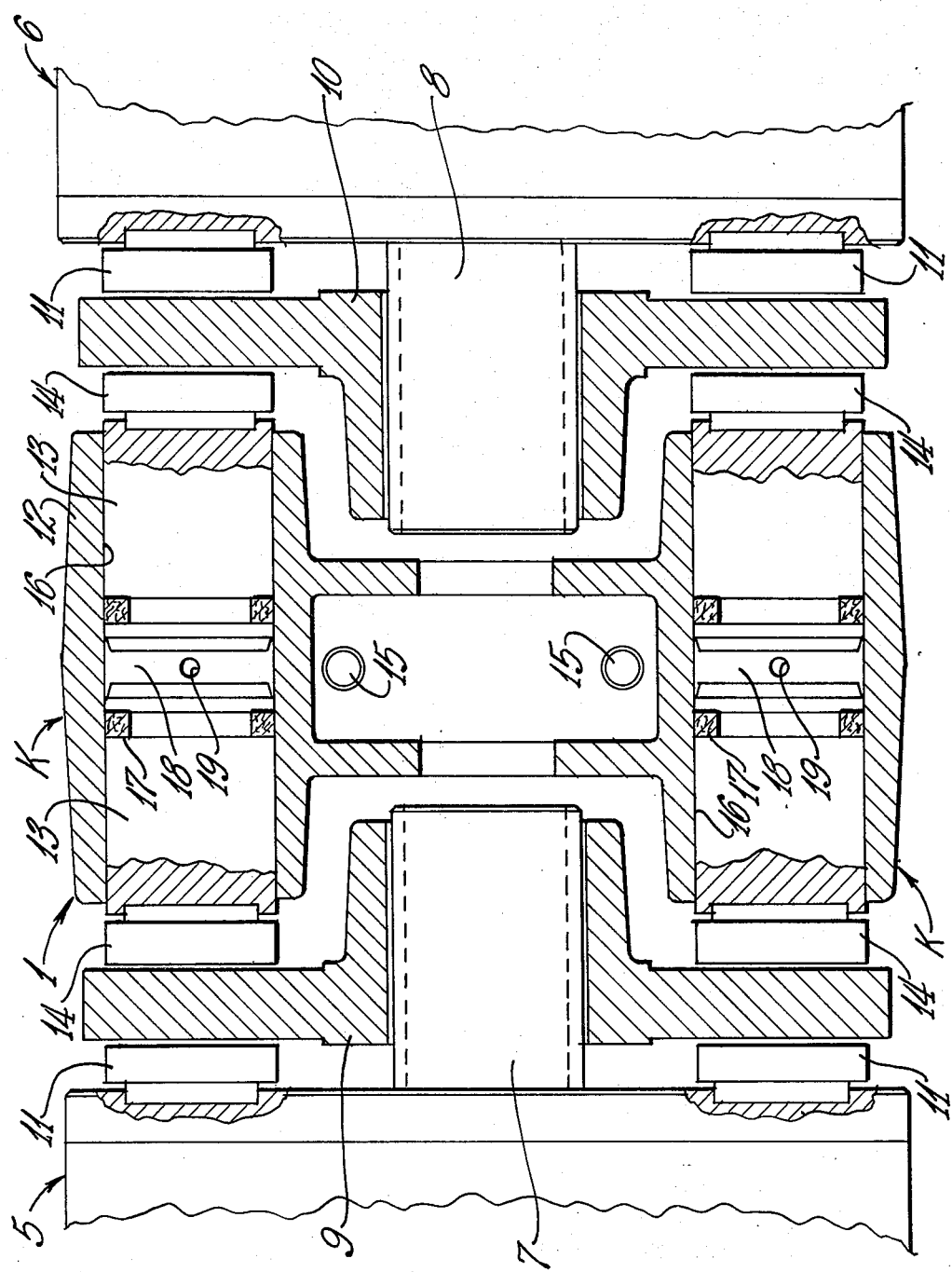
FIG. 2 is an enlarged sectional view of the brake assembly shown in FIG. 1.

According to FIG. 1, a disc brake assembly 1, an enlarged view of which is also given in FIG. 2, is arranged between motor drives 2 and 3 and acts on the two wheels L of an industrial vehicle 4. Brake discs 9, 10 are mounted for movement in an axial direction on splined shafts 7, 8 extending from transmission output housings 5, 6. Shafts 7, 8 are extensions of transmission output shafts (not shown) operatively connected to the wheels L. A brake housing 12 is attached to the vehicle frame, for example by bolts 15, between the brake discs 9, 10 and includes pairs of brake cylinders K (see FIG. 3) each comprising pairs of opposed brake pistons 13 received in bores 16. Brake shoes or pads 14 are attached to the outer faces of each of the four pistons 13 in alignment with one face of the discs 9, 10, and four corresponding brake shoes or pads 11 aligned with the opposite faces of the discs 9, 10 are fastened directly to the transmission housings 5, 6.

Figure 3:
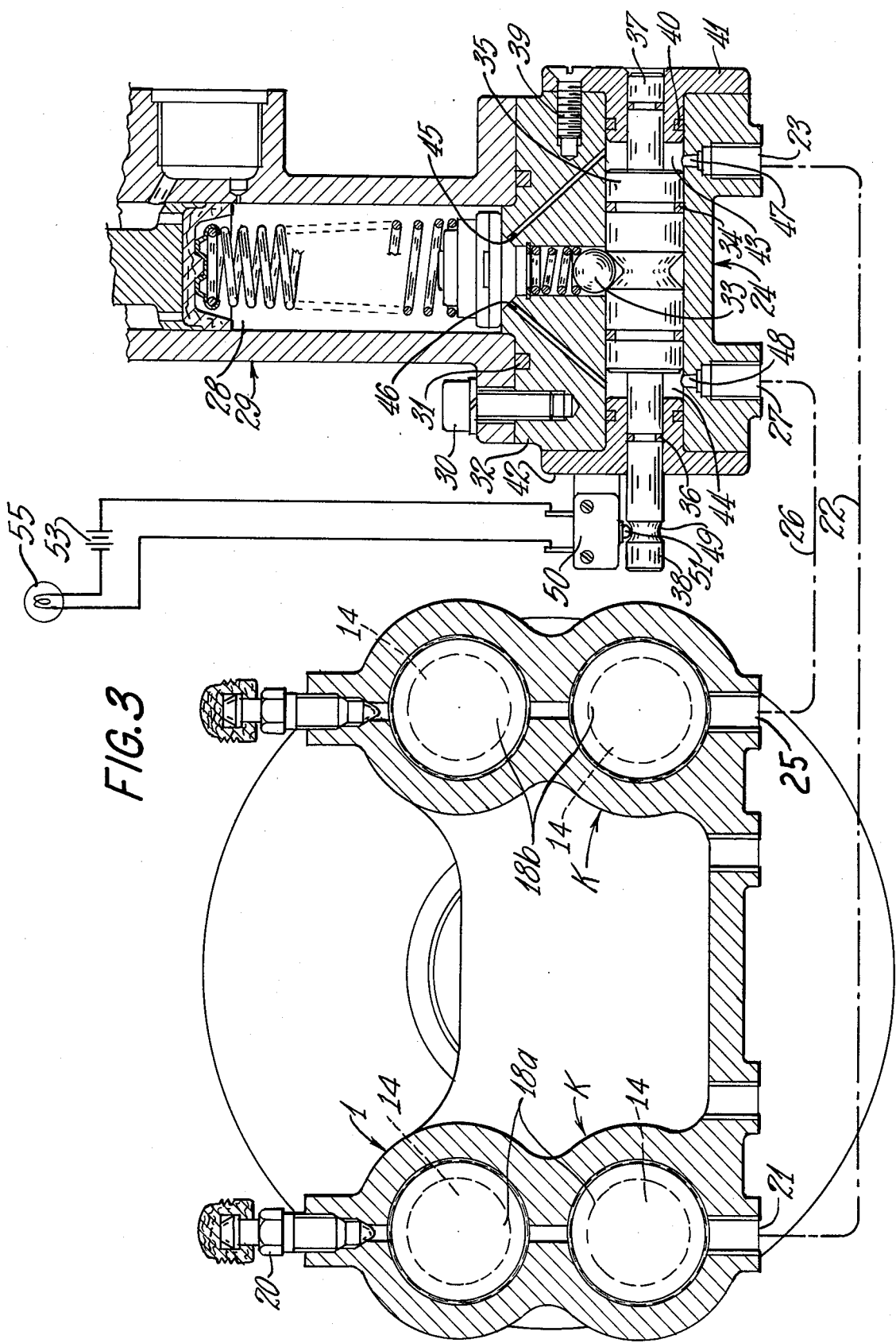
FIG. 3 is a partly schematic view of the brake system of the invention including a transverse sectional view of one of the brake assemblies of FIGS. 1 and 2, and a sectional view of a master cylinder and valve in accordance with the invention.

The four brake pistons 13 of each pair of cylinder K are installed in back-to-back pairs in the bores 16 of the brake housing 12 and are provided with packings 17, which seal against the walls of bores 16 to form pressure chambers 18 between each of the pairs of pistons 13. Referring to FIG. 3, the brake cylinders K are in upper and lower pairs, and the pairs of pressure chambers 18 are interconnected by ports 19 to form combined pressure chambers 18a and 18b. Conventional bleed valves 20 connect with each of the chambers 18a, 18b. Referring to FIG. 3, a connecting line 22 connects port 21 from the pressure chamber 18a to a connection 23 of a valve assembly 24, and a connecting line 26 connects port 25 from the pressure chamber 18b to a connection 27 of valve 24.

The valve 24 is connected to the outlet end of the pressure chamber 28 of a conventional master cylinder 29, and is fixed to the master cylinder by means of bolts 30 and sealed through packing 31. Valve 24 includes a housing 32 inside of which a spool 35 provided with seals 34 is retained in neutral position through a spring loaded ball catch 33. Reduced diameter spool ends 37 and 38, which are also provided with seals 36, are received in covers 41 and 42 fixed to the valve housing 32 by means of bolts 39 and provided with seals 40. The spool 35, housing 32, and covers 40, 41 are dimensioned to provide annular pressure chambers 43 and 44, the inlet ends of which are connected to the pressure chamber 28 via restricted passages 45 and 46. At their outlet ends, the annular chamber 43 is in connection with the port 23 through outlet 47 and the annular chamber 44 with the port 27 through outlet 48. The extended end 38 of the spool 35 has a switching groove 49 formed therein, which receives an actuator 51 of a normally open switch 50 attached to the cover 42. Switch 50 is illustrated in an electrical circuit comprising a power source 53, and an indicator lamp 55.

Under normal conditions, application of pressure to the combined pressure chambers 18a and 18b takes place through operation of the master cylinder 29, hydraulic pressure being transmitted from the pressure chamber 28, through passages 45 and 46, pressure chambers 43 and 44, outlets 47 and 48, connections 23 and 27, and through the connecting lines 22 and 26, to ports 21 and 25, to chambers 18a, 18b. Held by the ball catch 33, the spool 35 of the valve 24 remains in the center position as shown in the drawing, since the forces affecting the spool due to fluid pressure in chambers 43 and 44 are in equilibrium. When the chambers 18a, 18b are pressurized, the pistons 13 are forced outward pressing the pads 14 against the discs 9, 10 and moving the discs along splined shafts 7, 8 into contact with pads 11.

The result of an assumed rupture of the connecting line 26 during brake actuation is a relief of pressure in the pressure chamber 44. As a consequence, the passage 46 and port 48 are blocked by means of the spool 35, since the force, due to the unbalanced pressure in chamber 43 overcomes the holding force of the ball catch 33 and shifts the spool until it abuts the cover 42. At the same time, the electric switch 50 is actuated by the travel of the switching groove 49 and the related engagement of the switch actuator 51. If damage to connecting line 26 occurs prior to a brake application, the throttling effect of the restricted passages 45 and 46 will cause over-pressure in the pressure chamber 28, such over-pressure being imparted to the related intact circuit via the passage 45 after the application of the brake, while the pressure chamber 44 is relieved of pressure, causing the spool 35 to move to the left cutting off port 48 and passage 46. It can be appreciated that if the pressure chamber 43 is pressure-relieved when the brake is operated, the spool 35 will be shifted against the cover 41 and block the other circuit in a similar manner.

The end 38 of the spool 35 also serves as a resetting pin to return the spool 35 to its normal, centered position after a line rupture is repaired. When the illustrated indicator lamp circuit is employed, the position of the spool end 38, whether inward or outward from normal, indicated which brake circuit is affected. The electrical indicator circuit can also be eliminated, relying on the position of the spool to indicate both that a failure has occurred, and to identify the affected circuit.

It is understood that the subject invention is not limited to the present embodiment thereof, but that changes may be made without departing from the spirit of the invention. The invention might also be employed on non-driven wheels on an axis, in which case the two brake discs would simply have to be attached to the two wheels in a suitable manner. This type of embodiment could e.g. be used in a lift truck having a bogie-type rear steering drive wheel. It can also be appreciated that the cutoff valve of the invention is not restricted to use in a disc brake system but could also be employed in a drum brake system wherein pairs of brake shoes are expanded into contact with a brake drum or rotor.

I claim:

1. In a brake system for a vehicle, a brake rotor member rotatable with a wheel of said vehicle, a first brake shoe member engageable with said rotor member, a second brake shoe member engageable with said rotor member, first hydraulic actuator means acting on said first shoe member to apply a braking force to said rotor in response to a hydraulic pressure signal, second hydraulic actuator means acting on said second shoe member to apply a braking force to said rotor in response to said hydraulic pressure signal, a brake master cylinder for selectively applying hydraulic pressure signals to said first and second actuator means, a first conduit connecting said first actuator means to said master cylinder for receipt of said pressure signals, a second conduit connecting said second actuator means to said master cylinder, and a valve connecting said master cylinder and said first and second conduits, said valve comprising a body having a bore formed therein, a valve spool received in said bore, means retaining said spool substantially centered between opposed first and second pressure chambers formed in said body, means connecting said first conduit in fluid communication with said first chamber, means connecting said second conduit in fluid communication with said second chamber, and means connecting the pressure chamber of said master cylinder with said first and second chambers, a reduction of pressure within either of said chambers causing said valve spool to move toward the chamber of reduced pressure due to the resulting unbalanced pressure in the opposite chamber, said spool including a projecting portion extending outward of said body and visible outside said body, the position of said projecting portion relative to said body providing a visual indication of the position of said valve spool.

2. Apparatus as claimed in claim 1, including electrical indicator means operatively connected to said valve spool indicating movement of said valve spool into a position closing communication between said master cylinder and one or the other of said first and second conduits.

3. Apparatus as claimed in claim 2, in which said electrical indicator means comprises a circuit including a power source, a visible and/or audible warning means, and a switch closing said circuit in response to said movement of said valve spool.

4. Apparatus as claimed in claim 3, in which said switch is mounted on said valve body, said projecting member contacting an actuating member of said switch to complete said circuit.

* * * * *